United States Patent Office 2,720,472
Patented Oct. 11, 1955

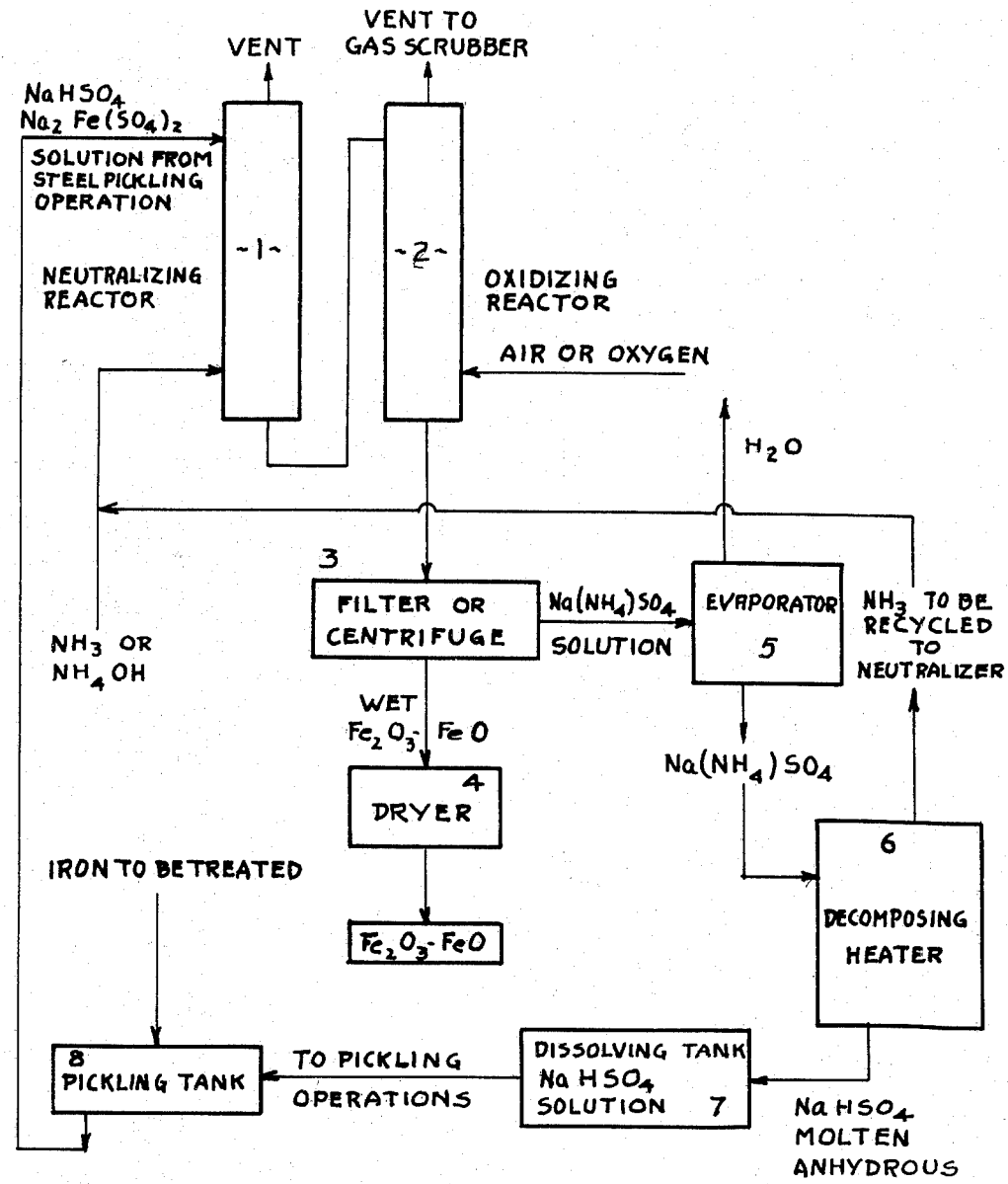

2,720,472

METHOD OF PICKLING IRON AND RECOVERING PICKLING AGENT

Clark O. Miller, Cleveland, Ohio, assignor to Cleveland Industrial Research, Inc., Cleveland, Ohio, a corporation of Ohio Application August 20, 1953, Serial No. 375,531

11 Claims. (Cl. 134—13)

This invention relates, as indicated, to a novel method for removal of oxide scale from ferrous metals and to the recovery for re-use of the pickling agent.

Since the inception of the modern steel industry, the removal of oxide scale from the metal has been accomplished by means of sulphuric acid, and to a much lesser extent by other mineral acids such as hydrochloric and phosphoric. The reaction of the sulphuric acid with the oxide results in a solution of ferrous sulphate commonly known as "pickle liquor" and because of the vast amounts of steel and iron so treated tremendous amounts of "pickle liquor" are obtained. Until comparatively recent times it was the practice to dispose of the pickle liquor by dumping into the rivers and lakes, resulting in pollution of both navigable and potable waters. Local, State and federal authorities have campaigned vigorously against such pollution for the benefit of the public and at the same time placed a heavy burden on the iron and steel industries through the enactment of laws designed to protect the waters from pollution to treat pickle liquor and dispose of the products in less harmful ways.

Many different approaches to the problem of disposal have been suggested or practiced including dumping the spent liquor into deep wells, abandoned mines, sumps or lagoons adjacent large bodies of water, and sewers leading to rivers, lakes and tidewaters. These involved no chemical treatment and frequently became unavailable through refusal of the collecting device to accept any more spent liquor, or the intervention of the legislature.

Neutralization by means of lime has been used but has proved costly and yielded no saleable by-product.

More elaborate chemical treatment means have been developed among which may be cited the neutralization oxidation procedure devised by R. D. Hoak and C. J. Sindlinger (Ind. Eng. Chem. 41, 65–70 (1949)). This process yields magnetic iron oxide. The Elzi Process (U. S. Pat. 2,427,555) utilizes scrap iron to neutralize the free acid in spent pickle liquor, passes this fluid through a packed tower where it is contacted with coke oven gas yielding a pH of from 7.0 to 7.5, thence through another tower where it is treated with pure ammonia to a pH of 8.0 to 8.5 and then through an air oxidation tower to oxidize the iron to ferric oxide, recovers the iron oxide by filtration and recovers the ammonium sulphate by evaporation of the filtrate.

The Tiddy process (U. S. Pat. 2,511,307) contacts pickle liquor with ammonia and hydrogen sulphide in two stages. A precipitate of ferrous oxide and ferrous sulphide is separated by decantation and part of the clear liquor is recycled to the pickle liquor. The remainder is further ammonia treated and the liquor aerated where the iron is oxidized and precipitated. The precipitate is removed and the filtrate evaporated for recovery of ammonium sulphate. The oxide-sulphide residue is sintered to provide a material which can be charged to a blast furnace.

Reference may be had to the report of the Ohio River Valley Water Sanitation Commission, Steel Industry Action Committee, entitled "Disposal of Spent Sulphate Pickling Solution," October 1952, for a recent analysis of the methods of treating pickle liquors to reduce stream pollution.

It is a principal object of this invention, therefore, to provide a process for pickling iron or steel which is free of major disposal problems.

The handling of free mineral acid either dilute or concentrated always involves risk to workers. The present invention avoids the use of free acids utilizing instead materials far less dangerous to those handling them.

The amount of sulphuric acid used in pickling processes throughout the world is indeed great and the consumption of this acid is almost directly proportional to the amount of steel produced. During the period of high steel productivity of the war and defense efforts, a serious shortage of sulphur, from which sulphuric acid is made, developed resulting in an increase in the cost of sulphur and its unavailability for other important uses. The material used in the present invention is in abundant supply and low in cost.

It is another object of this invention, therefore, to provide a process for removal of oxide scale from ferrous metals substituting for the more expensive, more difficultly handled and disposed mineral acids, an inexpensive, easily handled and recoverable material.

Still other objects of this invention will appear as the description proceeds.

To the accomplishment of the foregoing and related ends, said invention, then, consists of the means hereinafter fully described and particularly pointed out in the appended claims, the following description and annexed drawing setting forth in detail certain embodiments of the invention, such disclosed means constituting, however, but a few of the various forms in which the principle of this invention may be employed.

It has been found that certain alkali metal acid sulphates are admirably suited to removal of oxide scale from ferrous and that these materials are not only readily available, but may be nearly entirely recovered for re-use in the process thereby vastly restricting disposal problems and relieving steel processors of dependence upon mineral acids.

Broadly stated, therefore, this invention comprises a process for pickling ferrous metal which comprises the steps of immersing said metal in an aqueous pickling bath of an alkali metal acid sulphate selected from the group consisting of sodium acid sulphate and potassium acid sulphate, adding an ammonia-containing fluid, recovering the corresponding alkali metal ammonium sulphate from the spent pickle liquor, and heating said alkali metal ammonium sulphate to convert it to the corresponding alkali metal acid sulphate. The alkali metal acid sulphate thus recovered may then be returned to the pickling process.

An illustrative process embodying the principles of this invention is diagrammatically shown in the annexed flow sheet wherein sodium acid sulphate is used. The pickling bath is composed of an aqueous solution of sodium or potassium acid sulphate at any suitable concentration sufficient to cause a fairly vigorous reaction with iron oxide scale. Broadly, the initial concentration may range anywhere from 5% to the limit of solubility of the alkali metal salt used at the temperature employed. For most purposes, a 10% to 45% aqueous solution may be employed. Of course, as scale is dissolved, the concentration of the acid salt diminishes, but a continuous supply of fresh solution from the recovery unit serves to maintain a satisfactory rate of reaction or pickling. The selected temperature of the pickling bath is dependent upon the speed of reaction desired at a given concentration and may generally range between about 50° C. and 130° C., the more practical range being from about 80° C. to about 110° C.

The time of exposure of the work piece is of course dependent upon the extent of scaling, the concentration and the temperature of the treating bath. These factors also operate in the present sulphuric acid pickling processes so that those skilled in the art of pickling steel will be readily able to familiarize themselves with the behavior of the alkali metal acid sulphate baths as it relates to the desired end result. Normally the exposure time ranges from about 30 seconds to 20 minutes or more, depending on a great many production factors.

The present pickling operation results in the formation of ferrous sodium sulphate or ferrous potassium sulphate. The spent liquor is then cooled and treated with ammonium hydroxide in a neutralizing reactor 1 from ammonia liquor or with anhydrous ammonia. This results in the partial precipitation of the iron as a green gelatinous mass, difficult to filter. The slurry is now at a pH of from 7.0 to about 8.5.

This slurry is then oxidized in an oxidation zone 2 by blowing with air, or contacting with an oxygen containing gas in a packed tower in a counter-current manner. Other suitable oxidation agents, such as hydrogen peroxide, ammonium persulphate, etc. may be used if desired, but air seems to be the most economical. Catalysts for the oxidation reaction, such as $V_2O_5$, $MnO_2$, etc. may be used. The iron is thus caused to precipitate as a black or brown iron oxide, probably ferroso-ferric oxide complex, which may be readily separated by centrifuging or filtration (3), and dried (4).

These reactions may be represented by the following equations using sodium acid sulphate as the pickling agent. The equations would be the same were potassium acid sulphate to be substituted for the sodium acid sulphate yielding instead the corresponding potassium salts and complexes.

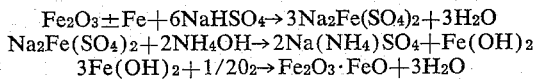

$$Fe_2O_3 \pm Fe + 6NaHSO_4 \rightarrow 3Na_2Fe(SO_4)_2 + 3H_2O$$
$$Na_2Fe(SO_4)_2 + 2NH_4OH \rightarrow 2Na(NH_4)SO_4 + Fe(OH)_2$$
$$3Fe(OH)_2 + 1/2O_2 \rightarrow Fe_2O_3 \cdot FeO + 3H_2O$$

The remaining clear solution contains then only the complex salt sodium or potassium ammonium sulphate with possibly a small amount of ammonium hydroxide. Potassium ammonium sulphate is less soluble in water than sodium ammonium sulphate and it may be necessary to exercise more care when neutralizing the potassium acid sulphate liquor. For example, more water may be added to maintain the solution. After filtration or separation of the iron oxide, this alkali metal ammonium sulphate liquor is then concentrated by evaporation in a single or multiple effect evaporator 5 until crystals of sodium (or potassium) ammonium sulphate are, or a mixture of crystals and saturated sodium (or potassium) ammonium sulphate solution is obtained.

The alkali metal ammonium sulphate thus obtained as a by-product may then be converted by heating to the alkali metal acid sulphate as shown by the equation:

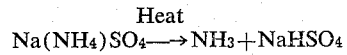

$$Na(NH_4)SO_4 \xrightarrow{\text{Heat}} NH_3 + NaHSO_4$$

Both of these decomposition products are returned to the process, the sodium (or potassium) acid sulphate to the pickle liquor make-up tank 7, and the ammonia to the precipitation step. It may be necessary from time to time to add additional quantities of each of these materials. The alkali metal acid sulphate may be agitated, passed over baffles, or blown with an inert gas to insure complete decomposition and removal of the ammonia gas. The decomposition ammonia may be collected either in water to make aqua ammonia or it may be compressed and cooled to yield liquid ammonia.

Alternately, if wet crystals or a slurry of sodium (or potassium) ammonium sulphate is fed to the decomposing heater 6 the water is first removed after which the crystals decompose to liberate ammonia which may be condensed along with the steam to form aqua ammonia directly.

The resultant alkali metal acid sulphate is then conveyed from the decomposer 6 and dissolved in water (7) to make a hot solution of alkali metal acid sulphate of the proper strength required for pickling and then returned to the pickling tank 8.

The by-product of this process is the black oxide of iron. There may be handling losses of ammonia and alkali metal acid sulphate, but make-up supplies of each are readily available. Hence the disposal problems are virtually nothing and sulphuric acid may be successfully replaced in pickling processes.

There are many modifications which can be made in the process described without departing substantially from this invention. For example, instead of oxidizing in the alkaline state, i. e., a pH of 7.1 to 8.5, the spent pickle liquor may be oxidized in the acid state, desirably in the presence of an oxidation catalyst, such as activated carbon, manganese salts, cobalt salts, or copper salts, etc., prior to the neutralization step wherein anhydrous or aqua ammonia is introduced. It may also be found desirable to neutralize the inhibitive effect of certain added agents prior to the oxidation step. Frequently such agents are included in the pickling bath to control the pickling action. It will be seen, therefore, that depending upon individual preference, either oxidation prior to neutralization or oxidation subsequent to neutralization may be used in the present process.

It should be understood that this process can be operated either as a continuous process or as a batch process.

In order to improve the speed of reaction, a wetting agent may be incorporated in the original pickle bath.

As indicated above, one of the by-products of the present invention is believed to be a ferroso-ferric oxide complex. This material may be recovered for the production of pigmentary materials, or after a sintering process returned to the blast furnace.

Other modes of applying the principles of this invention may be employed instead of those specifically set forth above, change being made as regards the details herein disclosed, provided the elements set forth in any of the following claims, or the equivalent of such be employed.

I, therefore, particularly point out and distinctly claim as my invention:

1. A process for pickling ferrous metal which comprises the steps of immersing said metal in an aqueous pickling bath of an alkali metal acid sulphate selected from the group consisting of sodium acid sulphate and potassium acid sulphate to yield ferrous alkali metal sulphate in aqueous solution, then by a process including the step of oxidation and raising the pH to at least 7 with an ammonia-containing fluid, thereby converting said ferrous alkali metal sulphate to oxide of iron and the corresponding alkali metal ammonium sulphate, recovering said alkali metal ammonium sulphate from the resulting solution, and heating said alkali metal ammonium sulphate to convert it to the corresponding alkali metal acid sulphate and returning said acid sulphate to the pickling operation.

2. A process for pickling ferrous metal which comprises the steps of immersing said metal in an aqueous pickling bath of an alkali metal acid sulphate selected from the group consisting of sodium acid sulphate and potassium acid sulphate to yield ferrous alkali metal sulphate in aqueous solution, oxidizing the resulting aqueous solution and then raising the pH to at least 7 with an ammonia-containing fluid, thereby converting said ferrous alkali metal sulphate to oxide of iron and alkali metal ammonium sulphate, recovering said alkali metal ammonium sulphate from the resulting solution and heating said alkali metal ammonium sulphate to convert it to the corresponding alkali metal acid sulphate and returning said acid sulphate to the pickling operation.

3. A process for pickling ferrous metal which comprises the steps of immersing said metal in an aqueous pickling bath of an alkali metal acid sulphate selected from the group consisting of sodium acid sulphate and potassium acid sulphate to yield ferrous alkali metal sulphate in aqueous solution, raising the pH of the resulting aqueous solution to at least 7 with an ammonia-containing fluid and then oxidizing the mass in the alkaline state, thereby converting said ferrous alkali metal sulphate to oxide of iron and the alkali metal ammonium sulphate, recovering said alkali metal ammonium sulphate from the resulting solution, and heating said alkali metal ammonium sulphate to convert it to alkali metal acid sulphate and returning said alkali metal acid sulphate to the pickling operation.

4. A process for pickling ferrous metal which comprises the steps of immersing said metal in an aqueous pickling bath of an alkali metal acid sulphate selected from the group consisting of sodium acid sulphate and potassium acid sulphate to yield ferrous alkali metal sulphate in aqueous solution, adding an ammonia-containing fluid, oxidizing the resulting solution in the alkaline state to precipitate oxides of iron and yield alkali metal ammonium sulphate in solution, recovering said alkali metal ammonium sulphate from said solution, and heating said alkali metal ammonium sulphate to convert it to the corresponding alkali metal acid sulphate and returning said alkali metal acid sulphate to said aqueous pickling bath.

5. A process for pickling ferrous metal which comprises the steps of immersing said metal in an aqueous pickling bath of an alkali metal acid sulphate selected from the group consisting of sodium acid sulphate and potassium acid sulphate to yield an aqueous solution containing ferrous alkali metal sulphate, raising the pH of the resulting solution to above about 7.5 with an ammonia-containing fluid, oxidizing said solution in the alkaline state to precipitate oxides of iron, recovering alkali metal ammonium sulphate from said solution, and heating said alkali metal ammonium sulphate to convert it to the corresponding alkali metal acid sulphate, and replenishing the alkali metal acid sulphate content of said aqueous pickling bath, with the thus recovered alkali metal acid sulphate.

6. A process for pickling ferrous metal which comprises the steps of immersing said metal in an aqueous pickling bath of an alkali metal acid sulphate, said bath being maintained at a temperature of at least about 50° C. and containing from about 10% to 45% by weight of said alkali metal acid sulphate to yield ferrous alkali metal sulphate in aqueous solution, raising the pH of said solution to above about 7.5 with an ammonia-containing fluid, oxidizing the alkaline solution with an oxygen-containing gas to precipitate oxides of iron, recovering alkali metal ammonium sulphate from said spent pickle liquor, and heating said alkali metal ammonium sulphate to convert it to the corresponding alkali metal acid sulphate and replenishing the alkali metal acid sulphate content of said aqueous pickling bath with the thus recovered alkali metal acid sulphate.

7. A process in accordance with claim 6 in which the ammonia-containing fluid is ammonia gas.

8. A process in accordance with claim 6 in which the ammonia-containing fluid is ammonia-water.

9. A process in accordance with claim 6 in which the oxygen-containing gas is air.

10. A process for pickling ferrous metal which comprises immersing said metal in an aqueous pickling bath of an alkali metal acid sulphate selected from the group consisting of sodium acid sulphate and potassium acid sulphate at a temperature of from about 50° C. to about 130° C., the concentration of said alkali metal acid sulphate in said bath being from about 10% to about 45% by weight, and the time of immersion being sufficient to remove the oxide scale from said metal, treating the spent pickle liquor with aqueous ammonium hydroxide solution to raise the pH of the solution up to from 7.1 to about 8.5, blowing the alkaline solution with air to precipitate oxides of iron, filtering, concentrating the filtrate by evaporation to recover alkali metal ammonium sulphate, heating the alkali metal ammonium sulphate thus recovered to regenerate alkali metal acid sulphate, and replenishing the alkali metal acid sulphate content of said aqueous pickling bath with the thus recovered alkali metal acid sulphate.

11. A process for pickling ferrous metal which comprises the step of immersing said metal in an aqueous pickling bath of an alkali metal acid solution selected from the group consisting of sodium acid sulphate and potassium acid sulphate to yield ferrous alkali metal sulphate in aqueous solution, then by a process including the steps of oxidation and raising the pH to at least 7 with an ammonia-containing fluid, thereby converting said ferrous alkali metal sulphate to oxide of iron and alkali metal ammonium sulphate, recovering alkali metal ammonium sulphate from the resulting solution, and heating said alkali metal ammonium sulphate to convert it to alkali metal acid sulphate and ammonia, and returning said alkali metal acid sulphate to the pickling operation and said ammonia to the neutralization step.

References Cited in the file of this patent

UNITED STATES PATENTS

| | | |
|---|---|---|
| 1,326,585 | Feenie | Dec. 30, 1919 |
| 1,364,822 | Vis | Jan. 4, 1921 |
| 1,754,358 | Griessbach | Apr. 15, 1930 |
| 2,218,117 | Marek | Oct. 15, 1940 |
| 2,694,657 | Brundin | Nov. 16, 1954 |
| 2,700,004 | Miller | Jan. 18, 1955 |

OTHER REFERENCES

Mellor, "Modern Inorganic Chemistry," page 400, Longmans, Green & Co., N. Y. (1939). (Copy in Patent Office Library.)

Mellor, "Comprehensive Treatise on Inorganic and Theoretical Chemistry," vol. II, page 706, Longmans, Green & Co., N. Y., 1922. (Copy in Patent Office Scientific Library.)